United States Patent [19]

Hagen et al.

[11] Patent Number: 4,844,630

[45] Date of Patent: Jul. 4, 1989

[54] METHOD AND CIRCUIT ARRANGEMENT FOR PROTECTION OF TYPEWRITERS OR SIMILAR MACHINES AGAINST CONSEQUENCES OF ELECTROSTATIC DISCHARGE

[75] Inventors: Klaus Hagen, Cadolzburg; Rudolf Spotka, Nuremberg, both of Fed. Rep. of Germany

[73] Assignee: TA Triumph-Adler Aktiengesellschaft, Nuremberg, Fed. Rep. of Germany

[21] Appl. No.: 279,160

[22] Filed: Dec. 2, 1988

Related U.S. Application Data

[63] Continuation of Ser. No. 8,857, Jan. 30, 1987, abandoned.

[30] Foreign Application Priority Data

Feb. 7, 1986 [DE] Fed. Rep. of Germany ....... 3603807

[51] Int. Cl.[4] ............................................ G06F 11/00

[52] U.S. Cl. ..................................... 400/54; 364/900; 364/936

[58] Field of Search ................ 400/54, 74, 279, 690.4, 400/693, 568; 361/390, 391; 364/200 MS File, 900 MS File

[56] References Cited

U.S. PATENT DOCUMENTS 4,327,410 4/1982 Patel et al. .......................... 364/200
4,618,953 10/1986 Daniels et al. ...................... 371/12
4,759,648 7/1988 Kobayashi et al. ................ 400/568

FOREIGN PATENT DOCUMENTS 0116182 7/1983 Japan .................................... 400/54
2035633A 6/1980 United Kingdom .
0156392 10/1982 United Kingdom .
2105377A 3/1983 United Kingdom .
2144890A 3/1985 United Kingdom .
2145253A 3/1985 United Kingdom .

*Primary Examiner*—Eddie P. Chan
*Assistant Examiner*—Michael A. Jaffe
*Attorney, Agent, or Firm*—Browdy and Neimark

[57] ABSTRACT

In a typewriter having a microprocessor for processing stored data according to a stored program, a method for detecting that a machine cover has been opened for servicing and for interrupting a data processing cycle in progress for as long as the cover remains open, said method including, in response to said interruption, the steps of storing in a portion of memory all data, addresses and flags required for the later continuation of the control cycle so that the programmable control unit can subsequently be brought into a condition in which it is insensitive to a great extent to the consequences of electrostatic discharges as may occur during servicing, and after closure of said machine cover after servicing, reconstructing the status of the control cycle prior to the termination, by entering the data, addresses and flags stored in memory into appropriate working registers and buffers.

5 Claims, 1 Drawing Sheet

METHOD AND CIRCUIT ARRANGEMENT FOR PROTECTION OF TYPEWRITERS OR SIMILAR MACHINES AGAINST CONSEQUENCES OF ELECTROSTATIC DISCHARGE

This application is a continuation of application Ser. No. 008,857, filed Jan. 30, 1987, now abandoned.

BACKGROUND OF THE INVENTION

1. Field of the Invention

The invention relates to methods for protecting typewriters or similar office machines in operation against the consequences of electrostatic discharges and to circuit arrangements for executing the methods.

2. State of the Art

Modern typewriters or similar office machines usually contain a so-called programmable control unit. This involves at least one microprocessor connected via data lines and address lines to a ROM containing the control program and to a RAM for storing variable data. Through driver circuits the programmable control unit controls electrical drive elements which in turn act upon mechanical devices such as type carriers, type carrier carriages, paper carriers, etc. Since access to the inside of the machine must be provided to change ribbon cassettes, type carriers, etc., the machine housings, usually made of plastic, have, in most cases, a flip-up cover.

In connection with a flip-up cover it is known in typewriters or similar office machines to provide a cover switch. This cover switch causes the programmable control unit to "stop" a control cycle in progress, i.e. directly before possible manipulations, upon opening the cover and to maintain this status for the period of time in which the cover is open. This "stopping" is accomplished, for instance, in that the cover switch, upon opening the cover, causes, by a change of its switch position, the microprocessor indirectly to branch out of the control cycle in progress into a waiting loop. The nature of the waiting loop is such that the microprocessor scans the cover switch cyclically as to a status change, again indirectly. When the cover is closed, the microprocessor detects this status change and branches back into the original control cycle, possibly after executing a so-called turn-on routine. It is mentioned here for the sake of completeness that movable parts (type carrier, type carrier carriage, etc.), possibly moved out of their original position are restored by the turn-on routine.

The reason for the above described procedure is, on the one hand, to prevent reliably unintentionally triggered motions of machine parts made accessible by opening the cover to preclude any danger of injury, and on the other hand, to make it possible to continue the control cycle at the point at which it was "stopped" after closing the cover.

Now, it has turned out that the manipulations involved in changing ribbon as above described cause an electromagnetic interference radiation to originate due to the discharge of electrostatic charges from the person performing the manipulations through jump sparking to conducting grounded machine parts. This electromagnetic interference radiation often changes the status in which the control cycle was stopped by changing data, addresses or flags stored in registers and buffers. The result thereof is that printing results obtained upon the continuation of the control cycle do not coincide with the desired printing result.

In connection with influencing the program flow in computers through electromagnetic waves which may stem, for example, from static discharges through jump sparking, it is known to shield the computers, or at least parts thereof, so as to be insensitive to electromagnetic waves to a large extent. It is also known to take measures to prevent the occurrence of such static discharges in the immediate vicinity of the endangered parts (processors). This can be accomplished, for instance, by insulating all grounded metal parts located in the danger zone.

While the above described measures solve the problem, they are associated with considerable costs and, moreover, cannot be used in all cases.

In connection with computers it is known, furthermore, to branch the program in progress, upon the occurrence of certain events such as failure of the voltage supply, exceeding a certain temperature, etc., into a so-called rescue routine which stores in an external memory all data, addresses and flags required to process the program further so that the program can be continued at the point of interruption after the elimination of the fault.

SUMMARY OF THE INVENTION

In accordance with the invention, there is provided a method of protecting information to be printed out by an electric typewriter or similar office machine under the control of a programmed control unit against loss as a consequence of electrostatic discharges as might be generated after interruption of processing by opening the machine for servicing, comprising the steps of generating a first signal indicating the typewriter housing has been opened for servicing and a second signal when the typewriter housing is closed, simultaneously applying said first signal to said programmable control unit and to the input of said electronic circuit, whereby said control unit will terminate the control step in progress and interrupt the continuation of the control cycle while going to a subprogram to store all data, addresses and flags required for further processing of the control cycle in progress in RAM, memory, and whereby said electronic circuit after a predetermined time delay generates an output signal for application to said programmed control unit to place it in a stable state in which it is insensitive to electrostatic discharges, applying said second signal to said electronic circuit whereby its output signal causes the programmable control unit to reconstruct, by means of the data, addresses and flags stored in write/read memory, the control cycle status which prevailed directly before the data, addresses and flags were stored, and then continuing with the execution of the control cycle.

The main advantage of the method consists in that an almost complete protection against the consequences of electrostatic discharges can be achieved at minimal cost for the control and negligible cost for the circuitry.

The method according to the invention is advantageous whether the time needed to conclude the control step in progress or to store the data, addresses and flags required for the later continuation of the control cycle is constant or case-dependent.

An object of the invention is in the provision of a method and circuits for executing the method which allows the protection of information being processed in typewriters or similar office machines against the consequences of electrostatic discharges as may occur through manipulations on these machines after their cover is flipped open.

BRIEF DESCRIPTION OF THE DRAWINGS

Other objects, features and advantages of the present invention will become better known to those skilled in the area from a reading of the following detailed description when taken in conjunction with the accompanying drawing wherein like reference numerals designate like or corresponding elements throughout the several views thereof and wherein.

DETAILED DESCRIPTION OF PREFERRED EMBODIMENTS

Figure 1:
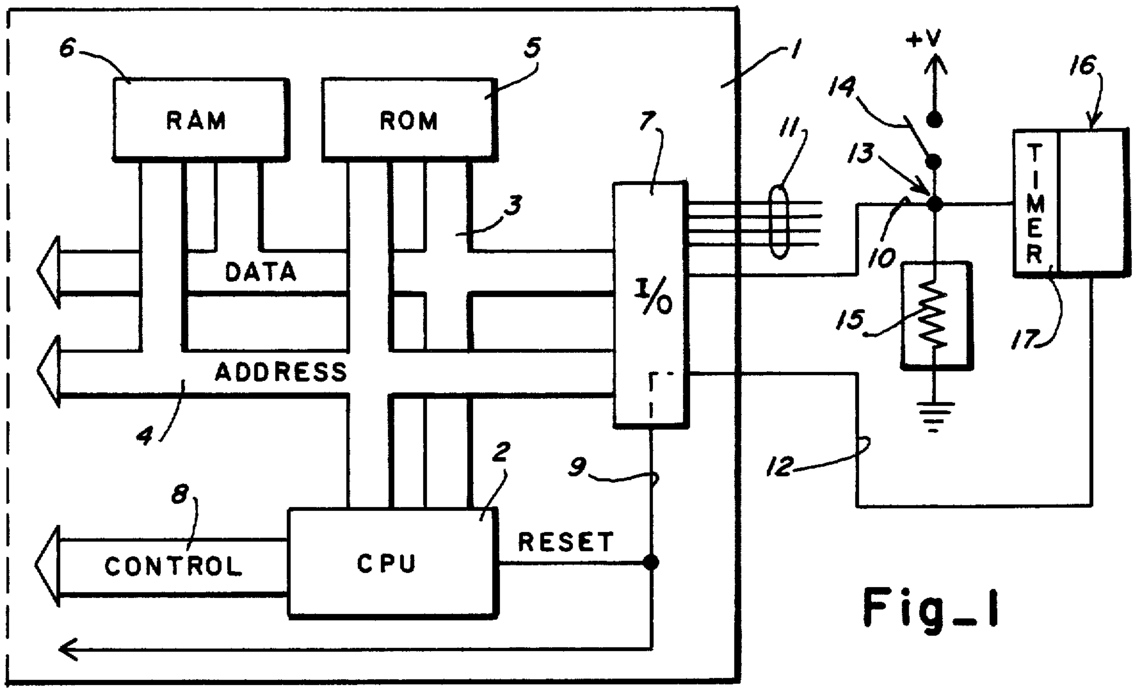
FIG. 1 is a block circuit diagram showing one embodiment for executing the method of the invention, and, FIG. 2 is a block circuit diagram of a second embodiment.

Referring now to the drawing there is shown in FIG. 1 a block circuit diagram of a part only of a programmable control unit 1 as used in known electronic typewheel typewriters. The control unit 1 includes a CPU in the form of a microprocessor 2 which is connected, via data lines 3 and address lines 4, to ROM 5 containing the typewheel typewriter control program, to RAM 6 storing the variable data, to an I/O port 7 and to other (not shown) circuit elements of the programmable control unit 1. The CPU 2 is also connected via control lines 8 to other, (not shown) circuit elements of the programmable control unit 1. The RESET input of the microprocessor 2 is connected to a reset line 9 which in turn is connected to the I/O port and to other (not shown) circuit elements of the programmable control unit 1.

The above-mentioned, other circuit elements (not shown) of the programmable control unit 1 might include, for example, other microprocessors, data transmission interfaces, other memories, interfaces to a keyboard and to driver circuits, etc., as used in the mentioned typewheel typewriters and generally known in connection with them. Since the other circuit elements are not necessary to the understanding of the methods according to the invention, they are not discussed in greater detail in the following.

As is common usage, the above-mentioned I/O port 7 is understood to be a circuit, by means of which the programmable control unit 1 can scan external lines 10, 11, or apply signals to them, and connect the control lines such as the reset line 9 directly to external circuit components. External lines are scanned or signals are applied to them in that the microprocessor 2 connects a certain address to the I/O port 7 via the address lines 4. This effects a quasi connection of an external line 10, 11 to a certain data line 3 which is then scanned or a signal is applied to it by the microprocessor 2.

As mentioned, the I/O port 7 is connected to lines 10, 11. The lines 11 have no significance for the method according to the invention, for which reason they are not further discussed. The line 10 connects the I/O port 7 to a point 13 of an external circuit. The point 13 is connected via a cover switch 14 to a supply voltage $+V_s$, to ground via a resistor 15, and to the input of an electronic circuit 16. The potential at point 13 depends upon the position of the cover switch 14. When the cover is closed, the cover switch 14 is also closed so that the point 13 is at potential $V_s$, and when the cover is open the cover switch 14 is also open so that the point 13 is at ground potential. The output of the electronic circuit 16 is connected to the reset line 9 via the line 12 and the I/O port 7.

The electronic circuit 16 functions so that the descending change in voltage from supply to ground potential at its input, point 13, triggers a timer 17 contained in the electronic circuit 16. After the set time delay has elapsed, the electronic circuit 16 transmits, via its output, a permanent reset signal to the line 14 and, hence, also to line 9. When switch 12 is thereafter closed, the ascending change in voltage from ground to supply potential at its input 13, causes the electronic circuit 16 to erase or remove the permanent reset signal at its output as soon as it arrives at the output. This causes a reset signal to be fed to the microprocessor always after the delay time to which the timing element is set has elapsed, regardless of whether the ascending change at input 13 of the electronic circuit appears before or after the lapse of the delay time.

Now that the function principle of the circuit 16 has been explained, the method will be described with reference to the circuit shown in FIG. 1. For illustrative purposes it is assumed that the programmable control unit 1 executes a character sequence stored in an input buffer which may be part of RAM 6. The term character sequence is understood to mean a sequence of print characters and commands put in by means of the keyboard or through a data transmission interface and buffered in an input buffer. It is assumed further that there is coordinated with the control program a scanning routine which is contained in ROM 5 and by means of which the microprocessor 2 scans the potential at the point 13 of the external circuit via the I/O port 7. This means that the control program is interrupted by the scanning routine in defined intervals. This scanning routine determines whether the cover switch 14 is open or closed.

If the cover of the typewheel typewriter is opened during the control cycle for the execution of the above-mentioned character sequence, not herein discussed in detail, the cover switch 14 opens and point 13 goes to ground. This negative going change triggers timer 17 of the electronic circuit 16. After the delay time to which the timer 17 is set has lapsed, the electronic circuit 16 emits at its output a permanent reset signal.

The change in potential at point 13 is also detected by the microprocessor 2 by the scanning routine mentioned with the result that after the character in progress has been processed, the microprocessor 2 branches into a subprogram contained in ROM 5. By means of this subprogram the microprocessor 2 stores all data, addresses and flags required for the continued execution of the character sequence in a location of RAM 6 specifically reserved for them and then branches into a waiting loop. Due to the selection of the delay time to which the timer 17 is set, the reset signal triggers by the electronic circuit 16 appears at the RESET input of the microprocessor 2 after the microprocessor 2 is already in the waiting loop. This puts the microprocessor 2 into its reset status in which it remains for the duration of the reset signal. In this state, the microprocessor 2 is insensitive to electromagnetic interference radiation stemming from sparking through electrostatic discharge as might be caused by manipulation internally of the typewriter housing.

When the typewheel typewriter cover is subsequently closed, the switch 14 is closed also. The signal at point 13 and, hence, at the input of the electronic circuit 16 then rises to the supply voltage and, in response, the electronic circuit 16 erases or removes the reset signal at its output as soon as it arrives. Due to the elimination of the reset signal the microprocessor 2 starts again. This means it goes into an initial status which makes it possible to run the programs contained in ROM 5, whereupon it reconstructs, by means of a subprogram contained in ROM 5, the control cycle where it was interrupted by reading out of the reserved location in RAM 6, all data, addresses and flags, and entering them in the registers and buffers in which they resided prior to the termination of the control cycle. After this has been done, the microprocessor 2 branches back out of the subprogram for the reconstruction of the control cycle into the control cycle itself and continues to further process the character sequence contained in the input buffer.

It should yet be noted regarding the flow of the method described that if a positive going signal appears at the input of the electronic circuit 16 before the lapse of the delay time, the short reset signal, which is generated also after the lapse of the delay time assures that the microprocessor 2 leaves the waiting loop.

Figure 2:
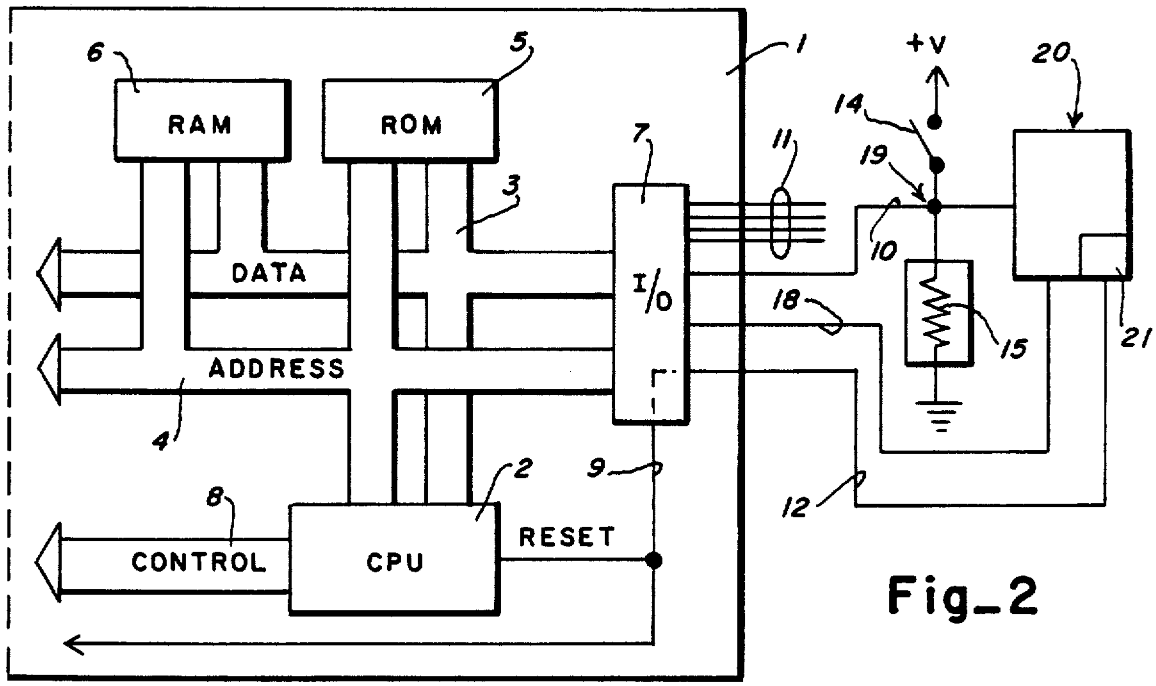

Referring now to FIG. 2 there is shown another embodiment of a method according to the invention. In this embodiment the programmable control unit 1 shown therein corresponds to the programmable control unit 1 in FIG. 1 so that it is unnecessary to repeat its description. Therefore, only the circuit components deviating from FIG. 1 will be explained in greater detail.

In FIG. 2 the I/O port 7 of the programmable control unit 1 is connected via a line 10 to a point 19 of an external circuit which in turn is connected to voltage supply $+V_s$ via the cover switch 14, to the first input of an electronic circuit 20 and, via a resistor 15, to ground. The potential at point 19 again depends upon the position of the cover switch 14 identical with that at point 13 of FIG. 1 so that a repeated description is unnecessary. The second input of the electronic circuit 20 and its output are also connected to the I/O port 7 of the programmable control unit 1 via lines 18 and 12, respectively.

The electronic circuit 20 functions so that when ascending voltage appears at point 19 it prepares or primes a circuit 21 contained in the electronic circuit 20 to generate a permanent reset signal. The prepared circuit 21 is set by a first ascending change at the second input of the electronic circuit 20 so that the permanent reset signal appears at the output of the electronic circuit 20. An ascending edge of the supply voltage at point 19, the first input of the electronic circuit 20, causes the electronic circuit 20 to clear the prepared circuit 21 after a predetermined delay time so that no reset signal can be generated or so that the set circuit 21 is reset, thereby eliminating the permanent reset signal at the output of the electronic circuit 20.

The method circuit according to FIG. 2 also starts from the assumption that a character sequence stored in an input buffer is being executed by the microprocessor 2. It is assumed further that there is associated with the control program a scanning routine which scans the switching status of the cover switch cyclically by scanning the potential at point 19. Accordingly, the conditions are the same as described in connection with the FIG. 1 embodiment.

If, in the course of the control cycle for the execution of the a character sequence, not herein discussed in detail, the cover of the typewheel typewriter is opened, the cover switch 14 will open, and point 14 will go to ground thereby preparing the circuit 21 contained in the electronic circuit 20. In addition, the microprocessor 2 through the scanning routine mentioned also detects that point 19 is at ground potential with the result that after processing the character which happens to be in progress at the moment, the microprocessor 2 branches into a subprogram contained in ROM 5. By means of this subprogram the microprocessor 2 stores all data, addresses and flags required for the further execution of the character sequence in a location of RAM 6 specifically reserved for this purpose and then scans the potential at point 19 again via the I/O port 7 and the line 10. The repeated scan of the potential at point 19 serves the purpose of determining whether the cover and, hence, the cover switch 14 are still open.

If the cover switch 14 is closed before a reset signal is triggered, the rising voltage at point 19 or at the first input of the electronic circuit 20 erases the preparation of the circuit 21. In addition, the microprocessor 2 detects that the point 19 is at supply voltage $V_s$ when last scanned as mentioned above. Thereupon, the microprocessor 2 branches into the subprogram for the reconstruction of the control cycle, circumventing the reset. The further events are identical with those in the embodiment of FIG. 1 in connection with the sub-program for the reconstruction of the control cycle, making a repeated description unnecessary here, too. Supplementarily it should merely be noted that the erasure of the preparation or priming of circuit 21 does not occur directly as a result of the change from ground to voltage $V_s$ at the first input of the electronic circuit 20, it rather is delayed by a predetermined period of time in order to prevent an undefined condition from occurring due to the possibility of the microprocessor 2 triggering simultaneously a positive going signal at the second input of the electronic circuit 20. In case of "simultaneity" of the events, accordingly, a reset signal is triggered.

It goes without saying that the methods described above in connection with FIGS. 1 and 2 are not restricted in their application to typewheel typewriters, but are applicable rather to all typewriters or similar office machines containing the devices mentioned in the introduction.

The description of the methods in connection with the processing of a character sequence stored in an input buffer should not be understood to be restrictive either. The methods are, of course, used in all control cycles such as scanning the keyboard, transmission of data to external equipment, etc.

In the FIG. 1 and FIG. 2 embodiments of methods according to the invention, the description, particularly of the functions in the microprocessor, are not discussed in detail, but on a relatively high logic level. This is due to the fact that the method according to the invention can be realized in connection with all commercial microprocessors. The applicants of the method in connection with a specific microprocessor presents no problem to the microprocessor control specialist, making a more detailed description leaning on certain microprocessor types unnecessary.

In closing it is pointed out yet that the reset status mentioned in the disclosed embodiments, in which the commercial microprocessor and, hence, the programmable control unit are insensitive to the consequences of electrostatic discharges, is not the only status having this effect. Particularly separating the microprocessor from the supply voltage has a comparable effect so that this aspect of the description is in the nature of an example only. Of course, the same applies analogously to the embodiment of the electronic circuits 16 (FIG. 1) and 20 (FIG. 2), especially regarding the reaction to rising or descending voltage at their input.

The invention claimed is:

1. A method for protecting business machines, such as typewriters, which are performing an operation, from consequences of electrostatic discharges, wherein the operation is execution of a control sequence during normal execution of the machine including at least one control step, wherein the control sequence is interrupted to prevent malfunctioning of the business machine due to electrostatic discharges and wherein the business machines comprise a programmable control unit which, through driver circuits, drives electrical drive members which in turn act on mechanical devices, a housing which contains at least the programmable control unit, the driver circuits and the electrical drive members, at least one housing cover through which the programmable control unit and the drive circuits and the electrical drive members are wholly or partially accessible, and at least one cover switch which undergoes a first change of state when the cover is opened and a second change of state when the cover is closed, said method comprising the steps of:

in event of a first change of state of the cover switch during the execution of a control sequence, causing the programmable control unit to complete the control step being executed;

causing the programmable control unit to discontinue the further control sequence and store all data, addresses and flags necessary for the further execution of the control sequence being executed, in a region of a read-write store;

priming an electronic circuit responsive to the first change of state of the cover switch;

setting the electronic circuit after the storage of the data, addresses and flags;

after the electronic circuit has been set, causing the electronic circuit to act on the programmable control unit such that the programmable control unit achieves a state which is stable against the consequences of electrostatic discharges;

causing the electronic circuit to hold the programmable control unit in this stable state until the electronic circuit is reset responsive to a second change of state of the cover switch;

causing the programmable control unit to restore the state of the control sequence prevailing immediately before the storage of the data, addresses and flags, by means of the data, addresses and flags stored in the read-write store; and causing the programmable control unit to continue to execute the control sequence.

2. A method as claimed in claim 1, wherein the setting of the electronic circuit is effected by a time function element which is contained therein and is independent of the programmable control unit and which is triggered by the first change of state of the cover switch.

3. A method as claimed in claim 1, wherein the setting of the electronic circuit is effected by an output signal from the programmable control unit which is applied to the input of the electronic circuit.

4. A circuit arrangement for protecting business machines, such as typewriters, which are performing an operation, from consequences of electrostatic discharges, wherein the operation is execution of a control sequence during normal execution of the machine including at least one control step, wherein the control sequence is interrupted to prevent malfunctioning of the business machine due to electrostatic discharges and wherein the business machines comprise a programmable control unit which, through drive circuits, drives electrical drive members which in turn act on mechanical devices, a housing which contains at least the programmable control unit, the driver circuits and the electrical drive members, at least one housing cover through which the programmable control unit and the drive circuits and the electrical drive members are wholly or partially accessible, and at least one cover switch which undergoes a first change of state when the cover is opened and a second changes of state when the cover is closed, said circuit arrangement comprising:

at least one microprocessor contained in the programmable control unit which is connected through data lines and address lines to a RAM store and to a ROM store, and having one input connected to the cover switch;

a supply voltage having one pole connected to the cover switch;

an electronic circuit having one input connected to the cover switch, an output connected to a RESET input of the microprocessor and containing a time function element triggered by a descending edge of a signal at the input of the electronic circuit;

means for causing the electronic circuit to feed a continuous reset signal after the expiration of a predetermined delay time to which the time function element is set through the output of the electronic circuit to the RESET input of the microprocessor;

means for causing the electronic circuit to cancel the continuous reset signal as a result of an ascending edge of the signal at the input of the electronic circuit, as soon as the continuous reset signal appears at the output of the electronic circuit; and means for providing a delay time from the triggering of the time function element in the electronic circuit to the triggering of the continuous reset signal at the output of the electronic circuit such that the microprocessor, triggered by a first low voltage level at the input connected to the cover switch, can carry out the discontinuance of the control sequence being executed.

5. A circuit arrangement for protecting business machines, such as typewriters, which are performing an operation, from consequences of electrostatic discharges, wherein the operation is execution of a control sequence during normal execution of the machine including at least one control step, wherein the control sequence is interrupted to prevent malfunctioning of the business machine due to electrostatic discharges and wherein the business machines comprise a programmable control unit which, through driver circuits, drives electrical drive members which in turn act on mechanical devices, a housing which contains at least the programmable control unit, the driver circuits and the electrical drive members, at least one housing cover through which the programmable control unit and the drive circuits and the electrical drive members are wholly or partially accessible, and at least one cover switch which undergoes a first change of state when the cover is opened and a second change of state when the cover is closed, the programmable control unit contains at least one microprocessor which is connected, through data lines and address lines, to a RAM store and to a ROM store, and having one input connected to the cover switch;

a supply voltage having one pole connected to the cover switch;

an electronic circuit having a first input connected to the cover switch, a second input connected to one output of the microprocessor, and an output connected to a RESET input of the microprocessor;

means for priming the electronic circuit responsive to a first descending edge of a signal at its first input;

means for setting the primed electronic circuit responsive to a first ascending edge of a signal at its second input;

means for causing the set electronic circuit to feed a continuous reset signal, through its output, to the RESET input of the microprocessor;

means for resetting the primed or set electronic circuit to its initial state responsive to a second ascending edge of the signal at its first input and if the electronic circuit is set so that the continuous reset signal is at its output, operable to cancel the continuous reset signal at its output; and means for causing the microprocessor to emit a signal with a first high voltage level at its output when the discontinuance of the control sequence, which is triggered by a signal with a first voltage level at the one input connected to the cover switch, has been carried out and a first low voltage level is applied to the one input connected to the cover switch.

* * * * *